W. E. LAPE.
HYDRAULIC POWER TRANSMISSION.
APPLICATION FILED JAN. 24, 1913.

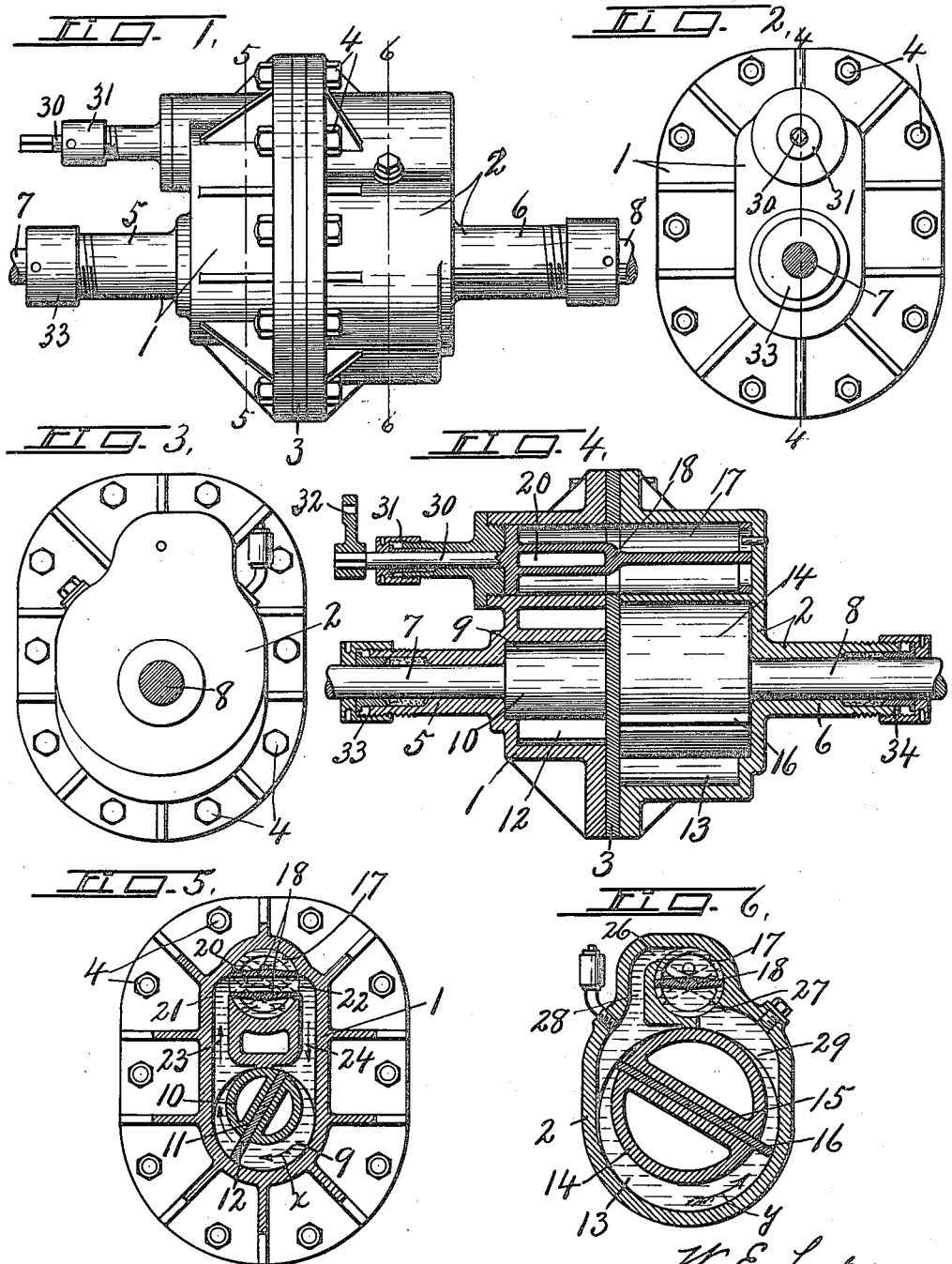

1,168,216.

Patented Jan. 11, 1916.

WITNESSES:

W. E. Lape
INVENTOR.

BY Howard P. Denton
ATTORNEY.

UNITED STATES PATENT OFFICE.

WILLARD E. LAPE, OF SYRACUSE, NEW YORK, ASSIGNOR OF ONE-HALF TO WILLIAM J. LEWIS, OF SYRACUSE, NEW YORK.

HYDRAULIC POWER TRANSMISSION.

1,168,216.  Specification of Letters Patent.  Patented Jan. 11, 1916.

Application filed January 24, 1913. Serial No. 743,908.

*To all whom it may concern:*

Be it known that I, WILLARD E. LAPE, of Syracuse, in the county of Onondaga, in the State of New York, have invented new and useful Improvements in Hydraulic Power Transmission, of which the following, taken in connection with the accompanying drawings, is a full, clear, and exact description.

This invention relates to certain improvements in hydraulic power transmission for motor vehicles and other uses in which it is desired to transmit rotary motion from one revolving part to another.

The main object is to commercialize the use of hydraulics as a noiseless, self-lubricating and variable speed power transmitting medium acting in conjunction with a relatively small compact mechanism of few parts as a more efficient substitute for the usual gear transmission and capable of being used as a service brake and clutch and for speed variations in either direction from minimum to maximum and is controlled at will by a single operating member on the steering wheel or other part of the machine within easy reaching distance of the operator.

In other words, I have sought to produce a positive drive hydraulic transmission controlled by a single valve in such manner that the motive fluid may be gradually diverted to the driven member for transmitting motion thereto in either direction from its normal position of rest through infinitesimal grades of speed from minimum to maximum and vice versa so that the driven member may be maintained at any speed from zero to the maximum speed of the driving element while the motive fluid acts as a service brake in automatically retarding the action of the driven member when its supply thereto is reduced in the operation of shifting the valve to cut down the speed of said driving element.

A still further object is to distribute the motive fluid so as to produce a more ideal torque varying inversely as the speed.

Other objects and uses will be brought out in the following description.

Figure 7:
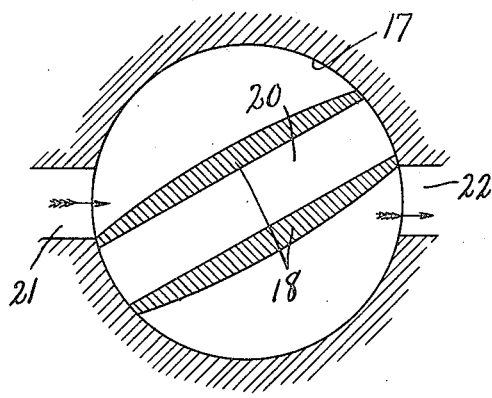
Figure 8:
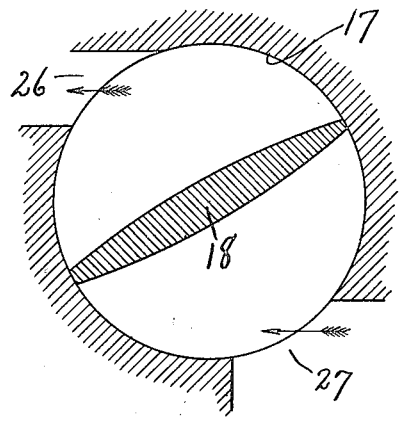
Figure 9:
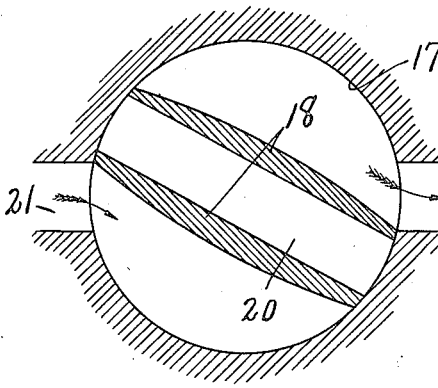
Figure 10:
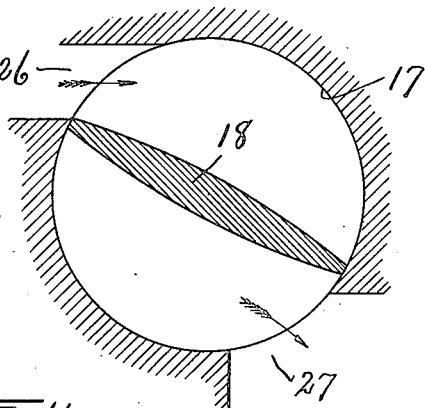
Figure 11:
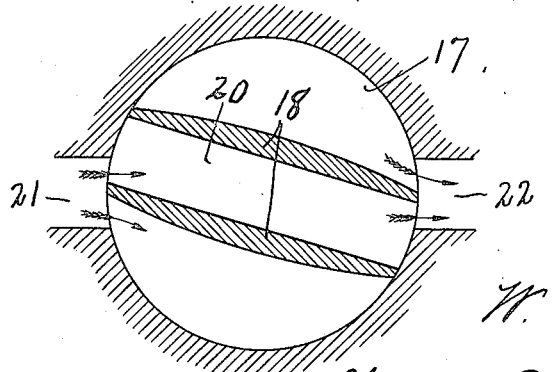

In the drawings—Figures 1, 2 and 3 are respectively a side elevation and opposite end views of a hydraulic power-transmitting device embodying the various features of my invention. Figs. 4, 5 and 6 are respectively a longitudinal sectional view taken on line 4—4, Fig. 2 and transverse sectional view taken on lines 5—5 and 6—6, Fig. 1. Figs. 7 and 8 are enlarged diagrammatic sectional views through opposite ends of the valve in position for operating the driven member at full speed in an opposite direction to that of the driving member. Figs. 9 and 10 are similar sectional views of the same valve in position for operating the driven member at full speed in the same direction as the driving shaft. Fig. 11 is a sectional view of the valve similar to that shown in Fig. 10 except that the valve is in position for operating the driven member at half speed in the same direction as the driving shaft.

As shown in the drawings, this power-transmitting device comprises a hollow casing composed of opposite sections —1— and —2— and an intermediate transverse partition or plate —3— dividing the interior of the casing into opposite compartments, the open ends of the casing sections being provided with marginal flanges of substantially the same form and size for receiving clamping bolts —4— by which the casing sections and partition plate are rigidly secured to each other to form an air-tight joint. These casing sections and the plate may be made of cast metal or any other suitable material, the sections —1— and —2— being provided with coaxial shaft bearings —5— and —6— for receiving respectively a driving shaft —7— and a driven shaft —8—. The casing section —1— is also provided with a cylindrical impeller chamber —9— of somewhat greater diameter than and eccentric to the shaft —7— for receiving a rotary impeller —10— on the inner end of the driving shaft —7—, said impeller being provided with a radial slot —11— therethrough for receiving a sliding gate —12— of substantially the same width and length as the diameter and length of the impeller chamber —9— in which it is adapted to move and, therefore, extends radially some distance beyond the periphery of the impeller drum —10—. In like manner, the opposite case section —2— is provided with a somewhat larger cylindrical motor chamber —13— for receiving a hydraulic motor drum —14— having a radial slot —15— in which is movable a sliding gate —16—, the motor chamber —13— being eccentric to the driving shaft —8— and drum —14— while the gate —16— is of substantially the same width and length as the diameter and length of the chamber —13— in which it is adapted to move so that the gate extends some distance beyond the periphery of the drum.

The casing, comprising the sections —1— and —2— and plate —3—, is provided with a valve chamber —17— wholly at one side of and preferably above the chambers —9— and —13— for receiving a rock-valve —18— having its opposite ends journaled in the outer walls of the casing sections —1— and —2— parallel with the axis of the shafts —7— and —8—.

The valve —18— is provided with a lengthwise diametrical web extending from end to end of the chambers —9— and —13—, the end of the valve corresponding to the chamber —13— being preferably solid while the opposite end corresponding to the chamber —9— is provided with a diametrically extending port or passage —20— normally registering with similar ports —21— and —22— in diametrically opposite sides of the valve chamber —17— and communicating through passages —23— and —24— with the impeller chamber —9— at opposite sides of the impeller drum —10—. The web of the valve —18— is of considerably less thickness than the diameter of the valve chamber so as to leave ample clearance for the passage of the motive fluid at either side of the web in any position of adjustment. The portion of the valve chamber —17— which overlies the motor chamber —13— is also provided with diametrically opposite ports —26— and —27— communicating respectively by passages —28— and —29— with the motor chamber —13— at opposite sides of the motor drum —14—, said ports —26— and —27— being located respectively above and below the corresponding sides of the valve which, in any position of adjustment, effectually cuts off communication between said ports.

The interior of the casing is entirely filled with the motive fluid, such as oil or equivalent substitutes, thereby filling the motor and impeller chambers and all passages and ports which may communicate therewith.

The object of the partition plate —3— is to effectively cut off direct communication between the impeller chamber —9— and motor chamber —13— except through the valve chamber —17— in a manner hereinafter described, while the valve chamber —17— extends through the plate and is common to both the impeller chamber and motor chamber, the valve being provided with a stem —30— extending axially through a stuffing box or gland —31— to the exterior of the casing for receiving an operating member —32— forming a part of any suitable operating mechanism which is mounted upon the steering wheel or other part of the vehicle within easy reaching distance of the operator. The driving and driven shafts —7— and —8— are also extended axially through suitable stuffing boxes or glands —33— and —34—, all of said glands serving to prevent leakage of the motive fluid, particularly when such fluid is subjected to maximum pressure under load.

It will be observed that the driving and driven elements and chambers in which they are adapted to revolve are similar except as to size, the impeller drum and motor drum being cylindrical and coaxial with their respective shafts —7— and —8—, while the cylinders or chambers in which they revolve are eccentric to the axes of said shafts so that the gates —12— and —16— are reciprocated in the diametric slots in their respective drums by contact with the inner walls of the cylinder as the drums are revolved, thereby maintaining a close running joint between the gates and cylinder in all positions.

The driving shaft —7— may be connected directly or indirectly to any motive power, such for example as an internal combustion engine so that the impeller —10— becomes the primary motive power for impelling or circulating the motive fluid through the various connected channels or passages of the transmitting device in a manner presently described.

When the engine and its impeller —10— are at rest or running light independently of the driven element —14—, the valve —18— is adjusted to a substantially horizontal position so as to register the ends of its port —20— with the diametrically opposite ports —21— and —22— while the opposite end of the web corresponding to the motor chamber —13— is disposed in a position midway between the ports —26— and —27— so that the slotted portion of the valve corresponding to the impeller chamber 9 normally cuts off communication between said impeller chamber and motor chamber and establishes direct communication between the passages —23— and —24— leading to the impeller chamber at opposite sides of the impeller. It therefore follows that when the engine or impeller is running light independently of the driven member, in the direction indicated by the arrow —X—, Fig. 5, the motive fluid will be circulated from the impeller chamber through the passage —23— and port —21— and thence through the port —20— of the valve and back through the port —22—, passage —24— to the opposite side of the impeller without liability of diverting any of such fluid to the motor chamber.

As previously intimated, this transmission device is adapted to rotate the driven member in either direction and for this purpose, the valve is rotarily adjustable through an arc of approximately 45° in either direction from its normal position so as to cause the motive fluid to be diverted to one or the other of the passages —28— or —29— leading from the ports —26— and —27— respectively to opposite sides of the motor —14— tangentially thereto. For example, assuming that it is desired to rotate the driven member in a reverse direction from that of the driving member, then it is simply necessary to rock the valve from its normal position to the left (Figs. 5 and 6) or to the position shown in Fig. 7 until the opposite ends of the valve port —20— are shifted to opposite sides or below and above their respective ports —21— and —22—, thereby registering the valve passage above the web with the port —21— to connect said port with the port —26— leading to the motor chamber —13—, it being understood that the portion of the valve web corresponding to the motor chamber will then be shifted through a corresponding arc but will still effectively cut off direct communication between the ports —26— and —27—, thereby causing the motive fluid under pressure of the impeller to be forced through the passage —28— and against the corresponding side of the gate of the motor —14— to rotate the same in the direction indicated by arrow —Y—, Fig. 6. When the valve is thus adjusted to effect a reverse drive of the driven member, the passage at the lower side of the web of the valve will be connected to the ports —22— and —27—, thereby establishing a return connection between the impeller chamber ad motor chamber to complete the free circulation of the motive fluid without undue resistance. On the other hand, if it is desired to rotate the driven member at full speed in the same direction as that of the driving member, the valve will be shifted through a corresponding arc in the opposite direction as shown in Figs. 9 and 10 until the opposite ends of its port —20— are brought respectively above and beneath the corresponding ports —21— and —22—, thereby connecting the passage below the valve web with the ports —21— and —27— while the passage above the web will connect the ports —22— and —26—, thus causing the motive fluid to travel from the impeller chamber through the passage —23—, port —21—, and along the lower side of the valve to the port —27— and thence through the passage —29— tangentially to the adjacent side of the motor drum —14— against the corresponding side of the gate —16— to effect the rotation of the driven member in the same direction as that of the driving member or in a direction opposite that indicated by the arrow —Y— in which case the motive fluid will be returned through the passage —28— and port —29— and along the passage above the web of the valve to the port —22— and thence through the passage —24— to the corresponding side of the impeller.

It is evident from the foregoing description and the accompanying drawings that the speed of rotation of the driven member from zero to maximum speed of the driving member depends upon the quantity of oil or other motive fluid which is permitted to circulate through the motor chamber and, while I have shown the valve as full open for maximum speed in reverse directions in Figs. 7 and 9, it is evident that by shifting the valve to intermediate positions, as for instance midway between its extremes as shown in Fig. 11, approximately only half of the motive fluid will be diverted from the impeller chamber to the motor chamber for operating the driven member substantially half the speed of that of the driving member and, in this particular instance in the same direction, but when shifted half way to the position shown in Fig. 7, it is evident that the motor will be driven at half speed in the reverse direction. These variable speeds of the driven member in either direction may, therefore, be varied infinitesimal degrees from zero to maximum speed of the driving member and vice versa according to the degree of movement of the valve from its normal position. This manner of impelling the motive fluid tangentially from the impeller and tangentially to the motor produces a maximum torque at starting but varies inversely as the speed increases and becomes normal at full speed, thereby producing a positive power-transmitting medium between the driving and driven elements under a minimum degree of resistance so that when the chambers and passages are entirely filled with the motive fluid, the action of the driven member is instantaneous and may be graded as to speed indefinitely between the limits of speed of the engine and, at the same time, when the valve is shifted to cut down the speed or to stop the driven member, the fluid acts as a brake to gradually retard the action of said driven member, thus permitting the valve to be manipulated, not only for the purpose of controlling the speed, but also to cause the motive fluid to act as a positive yet flexible clutch drive and also as an automatic service brake.

The power-transmitting device constructed in the manner shown and described may be made and operated at a comparatively low cost and has a wide range of use in that it provides unlimited speed variation in either direction and also serves as a clutch and automatic brake, and also avoids excessive friction, wear and breakage incidental to the use of tooth gears, friction bands, cones, brakes and other adjunctions of the ordinary gear transmission. This device is, therefore, particularly adapted as a variable speed power transmission for automobiles and similar motor vehicles and permits uniform speed independent of grade or load as long as the load is within the power and capacity of the engine and prevents increase of power and capacity of the engine and prevents increase of speed when the vehicle is traveling down grade, thus permitting the fuel supply to be shut off with the assurance that the engine will still run under momentum of the vehicle and, under such conditions, will effect a thorough scavenging of the cylinder and ports by the air which may be drawn therein. It is also evident that the speed-control and brake-control act simultaneously and equally in either direction forward or backward, thereby relieving the operator from the operation of various levers and assuring a more absolute control of the machine under all conditions.

What I claim is:

1. In hydraulic power transmission, the combination, with a rotary impeller and a coaxial rotary motor each having a pair of passages leading from opposite sides thereof, of a valve chamber parallel with the axis of the motor and impeller and located between the passages of each pair, said valve chamber having one set of diametrically opposite ports communicating with the passages of the impeller and another set of diametrically opposite ports communicating with the passages of the motor, and a rotary valve in the valve chamber controlling the ports of both sets and having means for connecting the impeller ports when adjusted to one position and separate means for cutting off communication between the motor ports when in such position.

2. In hydraulic power transmission, a casing having separate compartments end to end, an impeller in one compartment and a coaxial motor in the other compartment, a valve chamber common to both compartments and having one set of ports communicating with the impeller chamber at opposite sides of the impeller and another set of ports communicating with the motor chamber at opposite sides of the motor, and a rotary valve in the valve chamber parallel with the axis of the impeller and motor and provided with a transverse passage for connecting the ports of the impeller chamber and movable into and out of registration with said ports.

3. In hydraulic power transmission, a casing having an impeller chamber and a motor chamber arranged end to end and a valve chamber parallel with and at one side of the first named chambers and provided with separate sets of diametrically opposite ports, those of one set communicating with opposite sides of the impeller chamber and those of the other set communicating with opposite sides of the motor chamber, a rotary impeller in the impeller chamber, a rotary motor in the motor chamber, and a rotary valve in the valve chamber having means for cutting off direct communication between the motor ports without closing the same, said valve having a diametric passage for connecting the impeller ports and movable to opposite sides of said impeller ports to permit communication between the motor ports and impeller ports at opposite sides of the valve and independently of said passage.

In witness whereof I have hereunto set my hand this 20th day of January, 1913.

WILLARD E. LAPE.

Witnesses:
H. E. CHASE,
EVA E. GREENLEAF.